United States Patent
Foladare et al.

[11] Patent Number: 6,144,839
[45] Date of Patent: *Nov. 7, 2000

[54] ALPHANUMERIC PAGING SYSTEM

[75] Inventors: Mark Jeffrey Foladare, Kendall Park; Shelley B. Goldman, East Brunswick; Philippe Jakimowicz, Clifton; David Phillip Silverman, Somerville; Roy Philip Weber, Bridgewater, all of N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,876

[22] Filed: Apr. 4, 1997

[51] Int. Cl.[7] ........................................ H04Q 7/14
[52] U.S. Cl. .................... 455/31.3; 455/446; 340/825.44
[58] Field of Search .................. 455/31.1, 31.2, 455/31.3, 38.1, 38.4, 186.1, 340.825, 825.36, 38.3, 446; 340/825.44; 379/88.16, 88.22, 88.27

[56] References Cited

U.S. PATENT DOCUMENTS

| | | |
|---|---|---|
| 5,301,359 | 4/1994 | Van Den Heuvel et al. .......... 455/422 |
| 5,315,635 | 5/1994 | Kane et al. ............................. 455/31.2 |
| 5,317,621 | 5/1994 | Shibayama ............................. 455/31.2 |
| 5,327,486 | 7/1994 | Wolff et al. ................................ 379/96 |
| 5,452,356 | 9/1995 | Albert ........................................ 380/9 |
| 5,481,255 | 1/1996 | Albert et al. ........................ 340/825.55 |
| 5,481,590 | 1/1996 | Grimes ................................... 455/31.2 |
| 5,485,503 | 1/1996 | Diem ..................................... 455/31.2 |
| 5,493,692 | 2/1996 | Theimer et al. ....................... 455/26.1 |
| 5,561,702 | 10/1996 | Lipp et al. ................................. 379/57 |
| 5,574,439 | 11/1996 | Miyashita ........................... 340/825.44 |
| 5,652,572 | 7/1997 | Kido et al. ......................... 340/825.44 |
| 5,838,252 | 11/1998 | Kikinis ................................ 340/825.44 |

Primary Examiner—Daniel S. Hunter
Assistant Examiner—Darnell R. Armstrong
Attorney, Agent, or Firm—Oliff & Berrideg, PLC

[57] ABSTRACT

An apparatus and method provide a database in a pager that contains menus that may be displayed on a pager display. A paging service sends a page including an identification to the pager. The pager receives the identification, retrieves a menu from the pager database and displays the menu. The pager responds to the page based on a selection selected from the displayed menu.

12 Claims, 12 Drawing Sheets

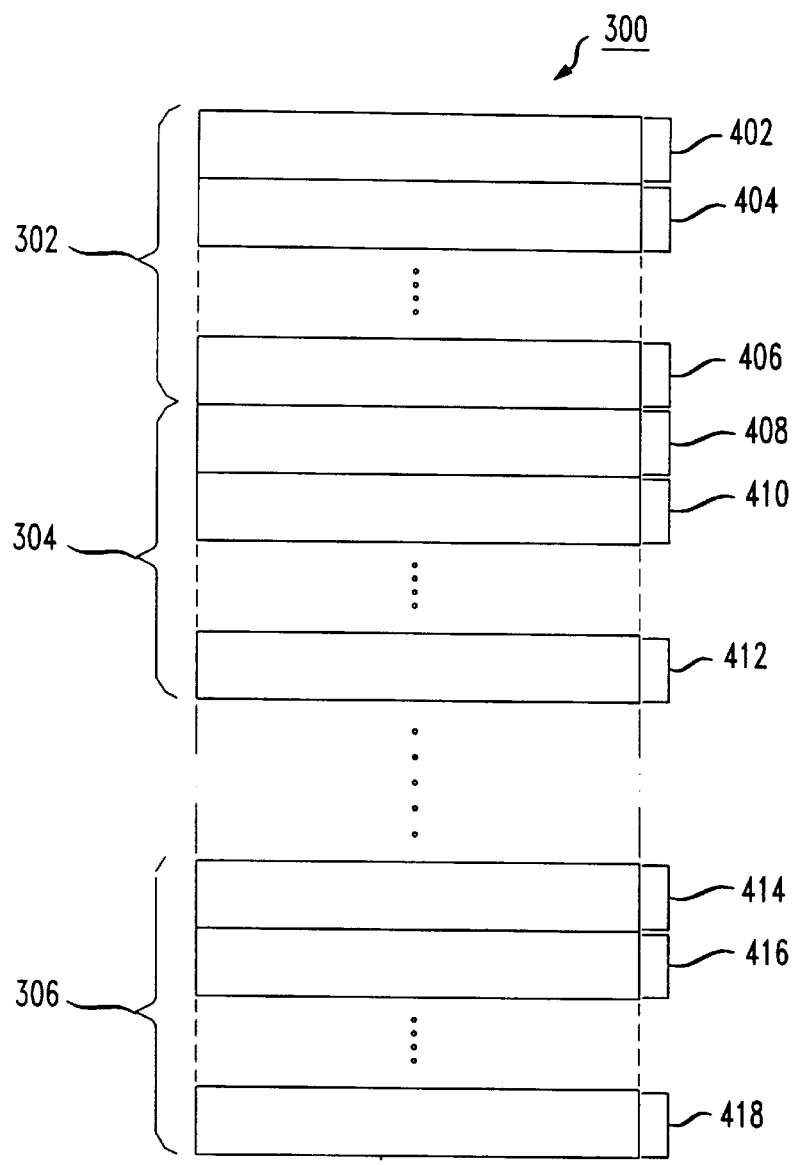

6,144,839

ALPHANUMERIC PAGING SYSTEM

This Application is related to U.S. Patent Application entitled "ALPHANUMERIC PAGING SYSTEM DATABASE" (Attorney docket No. FOLADARE-GOLDMAN-KAPSALES-SILVERMAN-WEBER 50-59-11-68-56) filed on even date herewith under common assignee.

BACKGROUND OF THE INVENTION

1. Field of the Invention

This invention relates to alphanumeric paging systems.

2. Background of the Invention

Advanced pagers provide two-way communication between a pager and a paging service. When a caller calls a paging service subscriber through the subscriber's pager, the paging service transmits a page to the pager causing the pager to display a menu on a pager display device. The menu indicates a number of choices that the subscriber may select for a response to the page. After a selection is made, the pager transmits a return message to the paging service and the paging service handles the paging call in accordance with the option selected by the subscriber.

The paging system described above requires the paging service to transmit menu information to the pager. Unfortunately, transmitting a menu requires a relatively large amount of bandwidth. Paging services prefer to transmit short messages for pages to conserve bandwidth especially during peak usage periods. However, short messages do not accommodate enough text for menus. Thus, there is a need to support two-way communication paging systems that consume minimal amounts of bandwidth but continue to support convenient menu features.

SUMMARY OF THE INVENTION

An apparatus and method of this invention provides a database in a pager that contains all the menus that may be displayed on the pager display device. When the paging service sends a page to the pager, a short message such as a menu identification is transmitted without the actual text of a menu. When the pager receives the menu identification, a corresponding menu is retrieved from the pager database and displayed on the pager display. Thus, the paging service can conserve bandwidth by transmitting only short messages for pages while the convenient menu features are completely supported.

The paging service maintains a database that contains menus associated with each supported pager. Each pager is associated with a plurality of menus. When a caller calls the paging service, menu identifications are retrieved from the database and transmitted to the pager.

BRIEF DESCRIPTION OF THE DRAWINGS

The invention is described in detail with reference to the following drawings, wherein like numerals represent like elements and wherein:

FIG. 3 is a diagram of a database organization in the pager;

FIG. 4 is a diagram of a menu identification file in a paging service database;

DETAILED DESCRIPTION OF THE PREFERRED EMBODIMENTS

Figure 1:
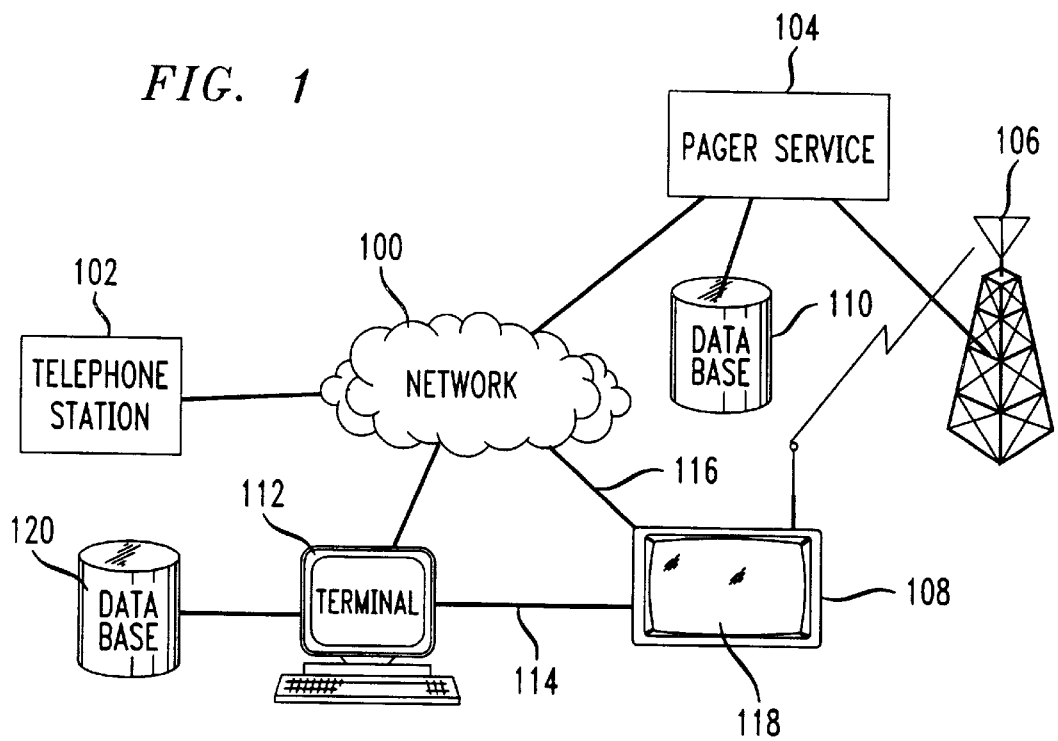
FIG. 1 is a diagram of an alphanumeric paging system.

FIG. 1 is a diagram of a paging system that includes a network 100 which interconnects a paging service 104 with a telephone station 102 and a terminal 112. The paging service 104 pages a pager 108 through a wireless transmission unit 106. The pager 108 includes a screen 118 that displays menus based on the page received from the paging service 104.

The paging service 104 is coupled to a database 110. The database 110 contains information such as menus relating to each supported pager such as pager 108. The menus corresponding to each potential caller of each of the supported pagers 108 is stored in the database 110. When a caller using telephone station 102, for example, calls the paging service 104 to send a page to pager 108, the paging service 104 searches the database 110 for a corresponding menu based on a caller identification (caller ID) of the caller. When a menu is found, the paging service 104 sends a page to the pager 108 that includes an identification such as a menu identification without including the actual text of the menu.

The pager 108 receives the menu identification with the page, retrieves a corresponding menu from an onboard database and displays the menu on the display 118. Thus, the paging service 104 conserves bandwidth by only transmitting an identification such as the menu identification to enable the pager 108 to display an appropriate menu.

A subscriber using pager 108 selects an option from the displayed menu and the pager 108 transmits the selected option as a command to the paging service 104. The paging service 104 executes appropriate functions based on the command received from the pager 108.

Figure 2:
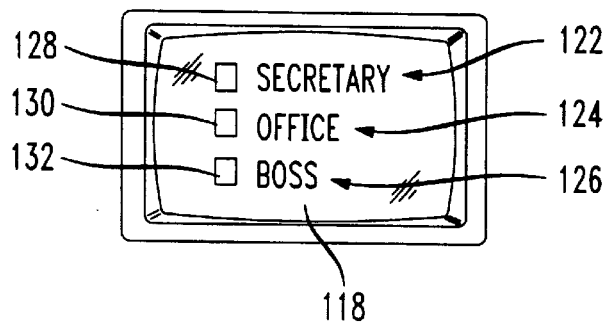
FIG. 2 is a diagram of an example menu to be displayed on a pager display.

FIG. 2 shows an example of a menu that is displayed on the pager display 118. The menu contains three possible options labeled as secretary 122, office 124, and boss 126. The subscriber may select the options by depressing selection areas 128, 130, and 132, respectively. The selection areas may be either displayed on the screen for a touch screen device or may be separate buttons arranged along the side of the display 118.

For example, if the subscriber selects the secretary 122, then the pager 108 transmits a command to forward the caller to the subscriber's secretary at a predetermined telephone number that is stored in the paging service database 110. If the subscriber selects the office 124 option, then the paging service 104 forwards the caller to a mailbox that corresponds to the subscriber's office telephone. If the subscriber selects boss 126, the paging service 104 forwards the caller to the subscriber's boss at the boss' telephone number that is stored in the database 110. Any number of other possible options and corresponding commands may be made available through the above described menu system. All the information associated with each selection for all the menus are stored in the database 110 of the paging service 104.

FIG. 3 shows an exemplary organization of the onboard database 300 in the pager 108. The database 300 is organized into menu subsets 302, 304 and 306 that may correspond to business, home and recreation, respectively, for example. Each of the menu subsets includes menu selections such as menus 402, 404 and 406 corresponding to menu subset 302; menus 408, 410 and 412 corresponding to menu subset 304; and menus 414, 416 and 418 corresponding to menu subset 306. The menus within each menu subset correspond to specific expected callers for that menu subset. The menu identification transmitted by the paging service 104 to the pager 108 uniquely identifies one of the possible menus 402–418 so that the pager may retrieve and display the menu that corresponds to the caller.

The paging service database 110 also contains a file similar to the database 300 as shown in FIG. 3. In addition to the information stored in the database 300, the database 110 contains information required to forward calls or taking other actions based on the subscriber command as discussed above.

The database 110 also contains a file 500 that relates caller IDs to a corresponding menu identification as shown in FIG. 4. The file 500 contains caller IDs in column 502 that corresponds to a menu identification in column 504. Thus, when a caller calls the paging service 104, the corresponding caller ID is used to determine an appropriate menu identification that is to be transmitted to the pager 108.

An expected caller may also be identified with multiple menus. For this situation, the message sent by the paging service 104 may include multiple menu identifications and the pager 108 may display a first menu with an indication that there are more menus. The subscriber may scroll through the menus before a selection is made.

The file 500 may associate multiple menu identifications with each expected caller. Indications in the file 500 such as chain flags may be used to link several menu identifications together to associate several menu identifications with each caller ID.

Figure 5:
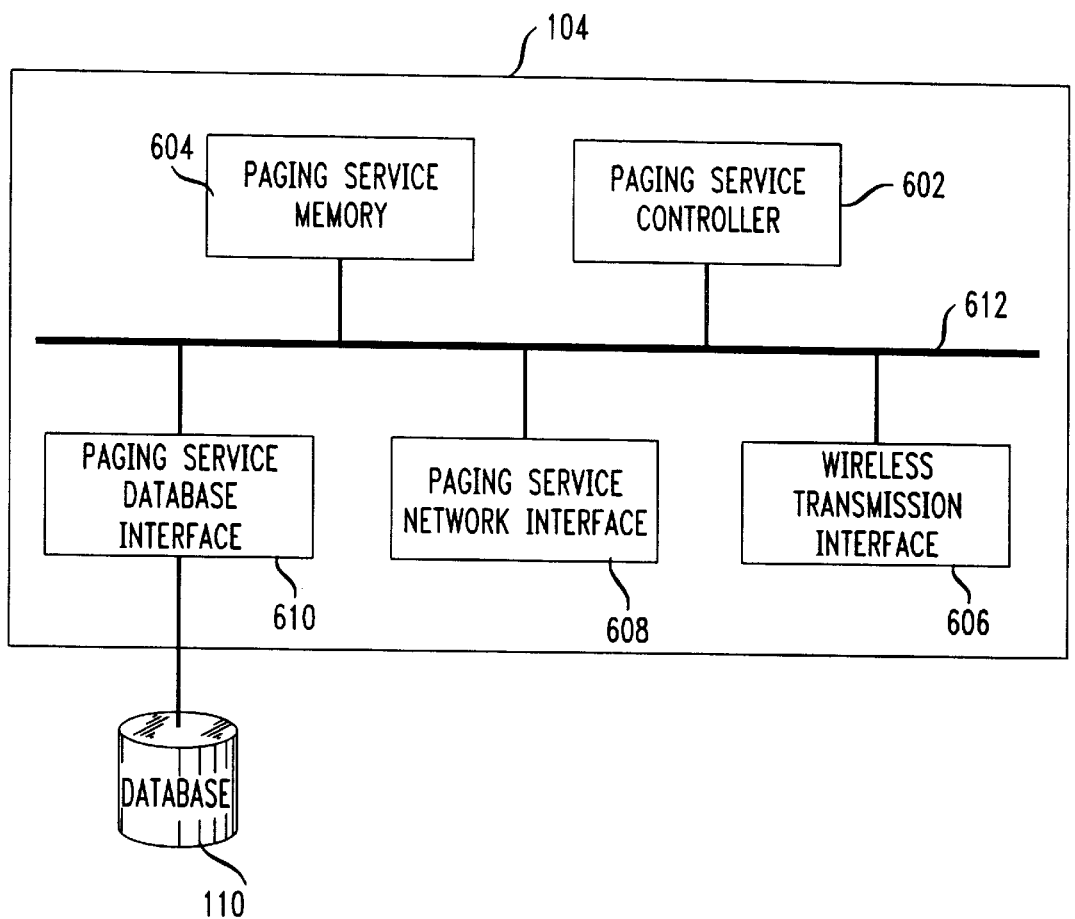
FIG. 5 is a block diagram of the paging service.

FIG. 5 is a block diagram of the paging service 104. The paging service 104 includes a paging service controller 602, a paging service memory 604, a wireless transmission interface 606 that interfaces with the wireless transmission unit 106, a paging service network interface 608 that interfaces with the network 100 and a paging service database interface 610 that interfaces with the database 110. While FIG. 5 shows the database 110 as an external database, the database 110 may be incorporated in the paging service memory 604. All the components of the paging service 602-610 are coupled together through signal bus 612.

Figure 6:
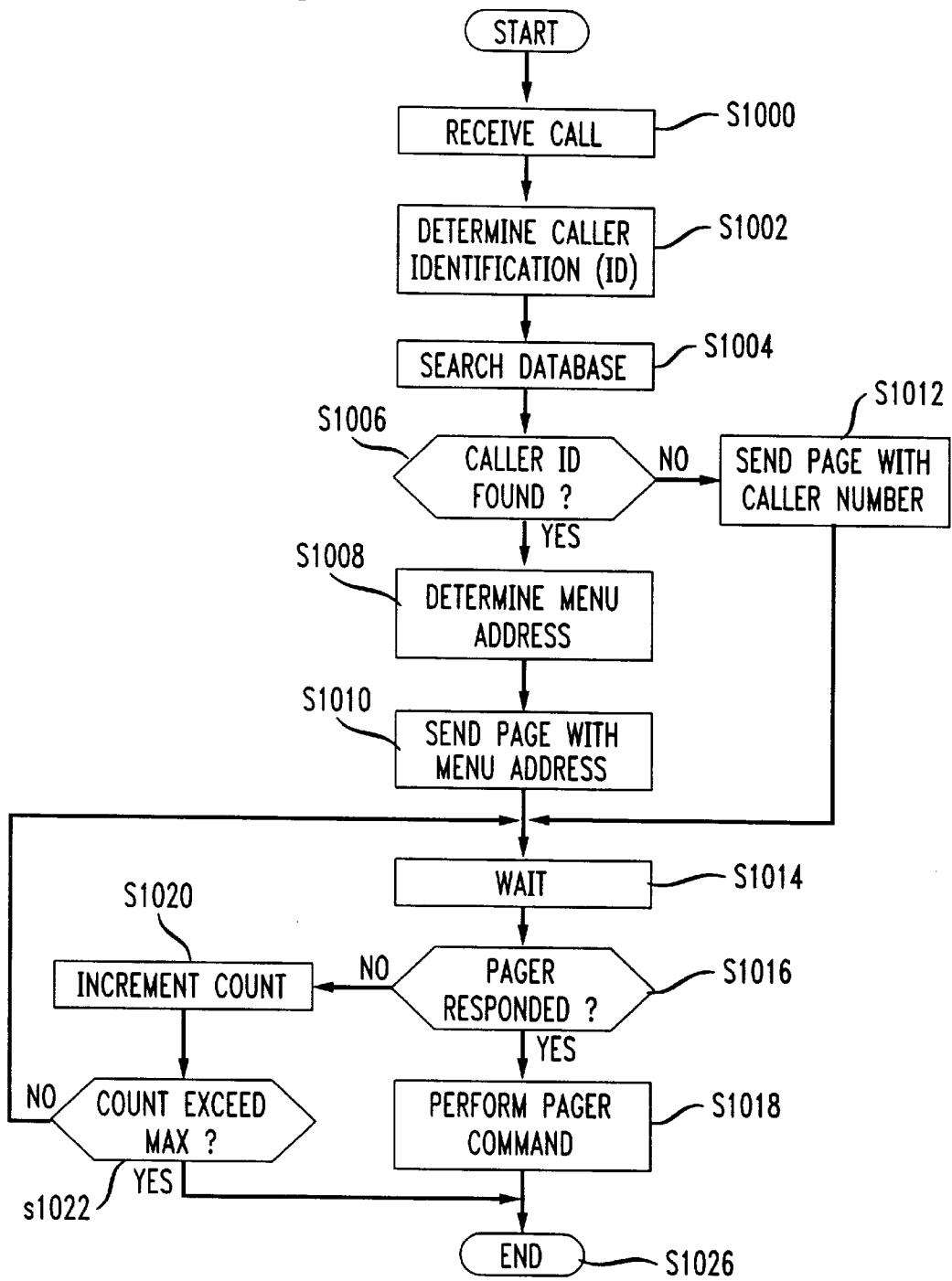
FIG. 6 shows a flowchart of a paging service process for receiving a call.

When a caller calls the paging service 104, the paging service network interface 608 receives the call and alerts the paging service controller 602 of the call. A flowchart of a process executed by the paging service controller 602 for receiving a call is shown in FIG. 6.

In step S1000, the paging service controller 602 receives the call through the paging service network interface 608 and goes to step S1002. In step S1002, the paging service controller 602 determines the caller ID of the caller and then goes to step S1004. In step S1004, the paging service controller 602 searches the database 110 through paging service database interface 610 for a menu identification that corresponds to the caller ID and then goes to step S1006. In step S1006, the paging service controller determines whether the caller ID was found in the database 110. If the caller ID was found, then the paging service controller 602 goes to step S1008; otherwise, the paging service controller 602 goes to step S1012.

In step S1008, the paging service controller 602 determines the menu identification from the database 110 and goes to step S1010. In step S1010, the paging service controller 602 sends a page that includes the menu identification determined in step S1008 to the pager 108 through the wireless transmission interface 606. In step S1012, the paging service controller 602 sends a page to the pager 102 with a number that identifies the caller such as the caller's telephone number and goes to step S1014.

In step S1014, the paging service controller 602 waits for a period of time and then goes to step S1016. In step S1016, the paging service controller 602 determines whether the pager 108 responded to the page by sending a return message. If the pager responded by sending the return message, the paging service controller 602 goes to step S1018; otherwise, the paging service controller 602 goes to step S1020.

In step S1018, the paging service controller 602 performs tasks indicated by a command contained in the return message and goes to step S1026 to end the process. In step S1020, the paging service controller 602 increments a count and goes to step S1022. In step S1022, the paging service controller 602 determines whether the count exceeded a maximum. If the count exceeded a maximum, the paging service controller 602 goes to step S1026 and ends the process; otherwise, the paging service controller 602 returns to step S1014.

Figure 7:
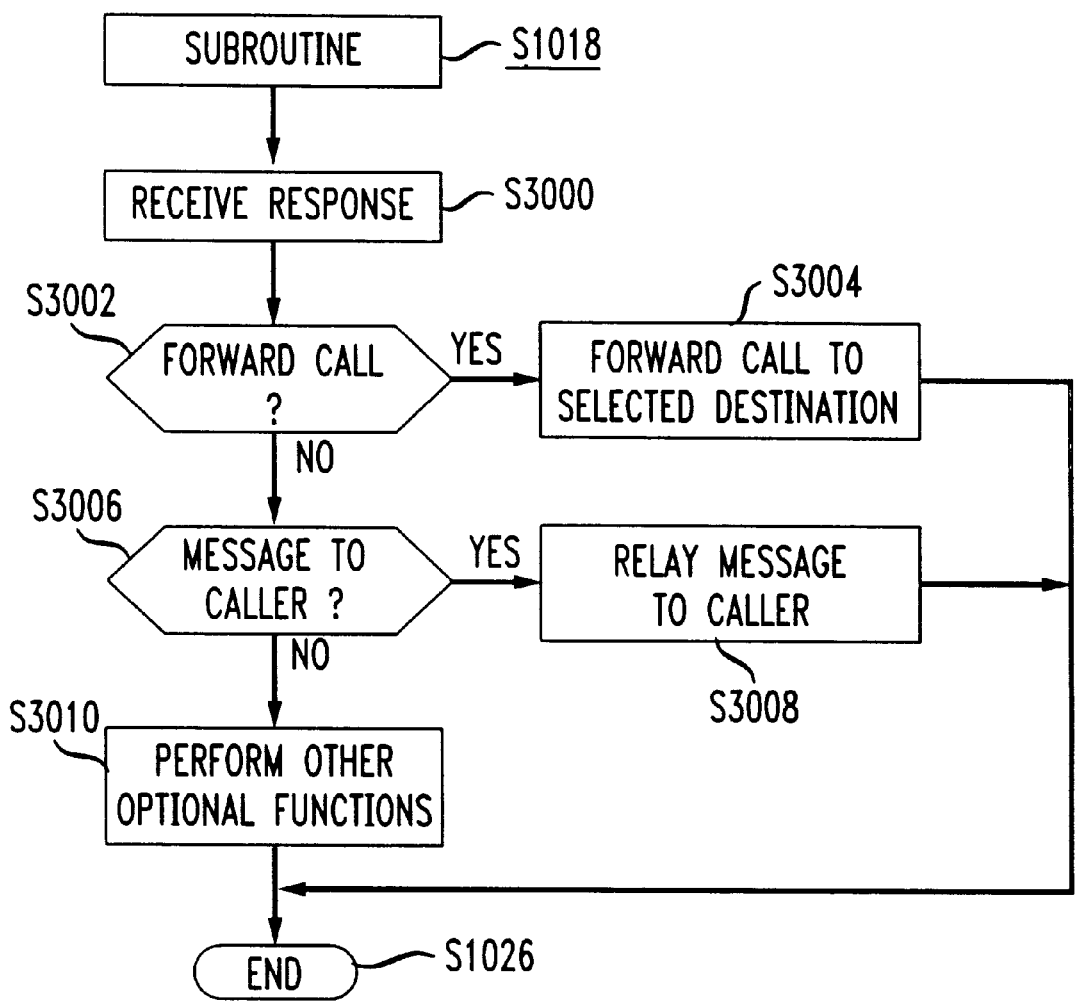
FIG. 7 is a flowchart of the paging service process for performing a command received from the pager.

FIG. 7 shows the step S1018 of FIG. 6 in greater detail. In step S3000, the paging service controller 602 receives the return message from the pager 108 and then goes to step S3002. In step S3002, the paging service controller 602 determines whether the command in the return message indicates that the caller should be forwarded to another number or service. If the command indicates that the caller should be forwarded, the paging service controller 602 goes to step S3004; otherwise, the paging service controller goes to step S3006. In step S3004, the paging service controller 602 forwards the caller to the selected destination indicated by the command and then goes to step S1026 and ends the process. In step S3006, the paging service controller 602 determines whether the command indicates that a message is to be sent to the caller such as "will call back in an hour." If a message is to be sent to the caller, the paging service controller 602 goes to step S3008; otherwise, the paging service controller 602 goes to step S3010. In step S3008, the paging service controller 602 relays the message to the caller. After the message is relayed to the caller, the paging service controller 602 goes to step S1026 and ends the process.

In step S3010, the paging service controller 602 performs other optional functions that may be provided by the telephone system and subscribed to by the subscriber. Then the paging service controller 602 goes to step S1026 and ends the process.

Figure 8:
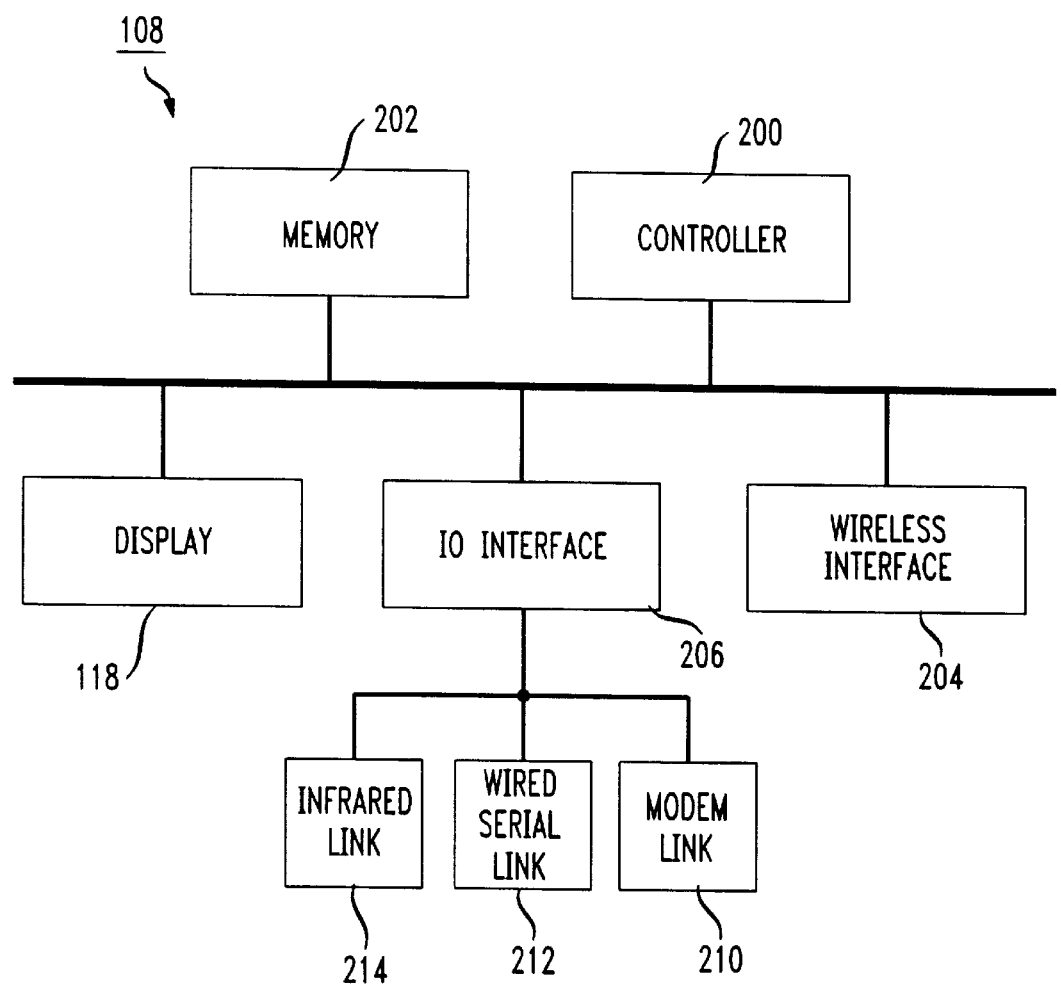
FIG. 8 is a block diagram of the pager shown in FIG. 1.

FIG. 8 shows a block diagram of the pager 108. The pager includes a controller 200, a memory 202, a wireless interface 204 that receives the page from the paging service 104, an IO interface 206 and the display 118.

Figure 9:
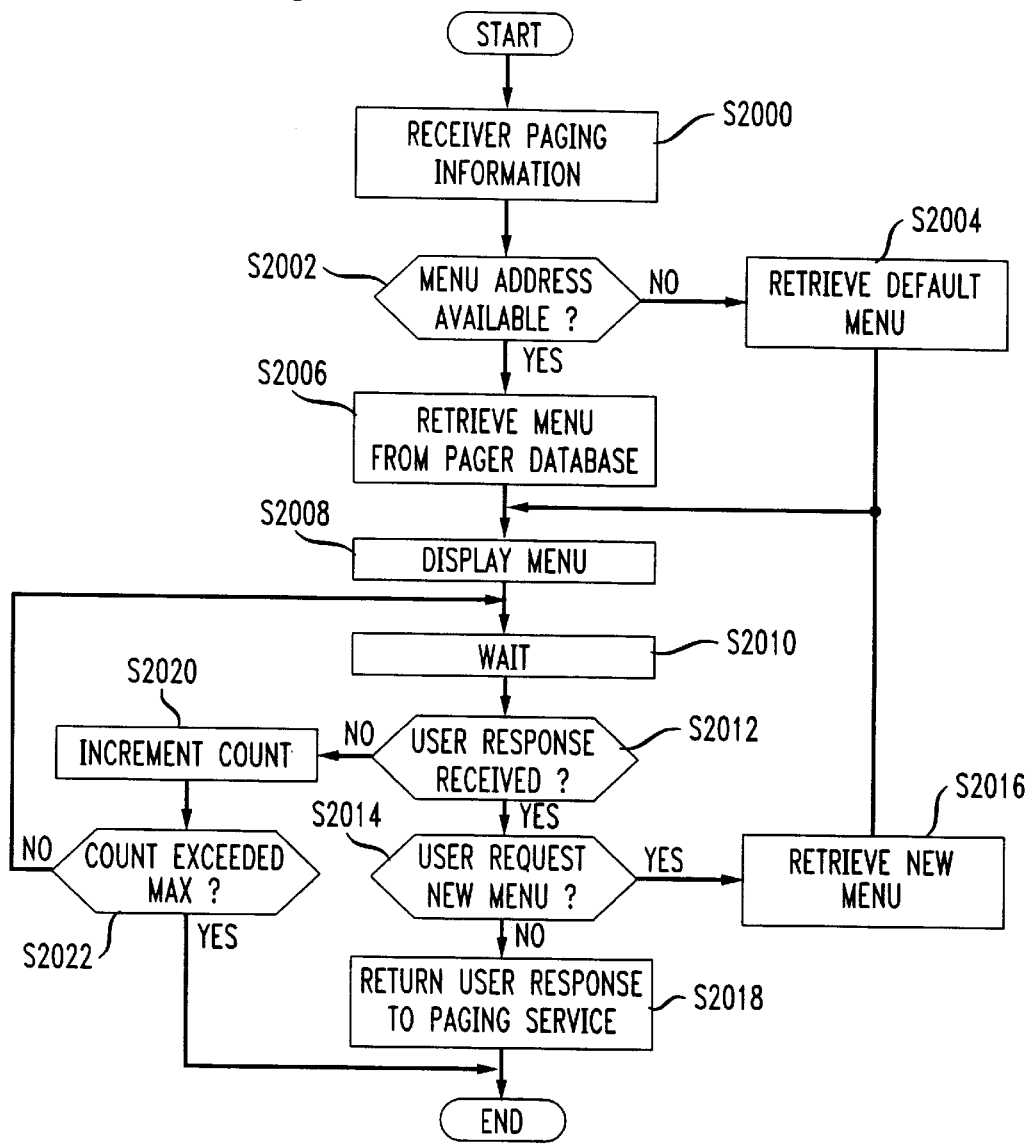
FIG. 9 is a flowchart of a process in the pager for receiving a page.

FIG. 9 shows a process of the controller 200 for receiving and processing a page. When the paging service 104 sends a page to the pager 108, the wireless interface 204 receives the page and sends the page to the controller 200. Then, in step S2000, the controller 200 receives the paging information and goes to step S2002. In step S2002, the controller 200 determines whether the menu identification is provided in the page. If the menu identification is provided, the controller 200 goes to step S2006; otherwise, the controller 200 goes to step S2004.

In step S2006, the controller 200 retrieves the menu corresponding to the menu identification from the onboard database located in the memory 202 and goes to step S2008. The memory 202 may be implemented by using standard memory components such as static RAM (SRAM), flash memory, or other volatile or non-volatile storage devices. If a volatile storage means is used, a battery system maintains the information in the volatile memory.

In step S2004, the controller 200 retrieves a default menu from the onboard database in the memory 202 and goes to step S2008. The default menu may contain selections such as call forwarding the caller to an office or home mailbox or sending a message to the caller.

In step S2008, the pager displays the menu on the display 118 and goes to step S2010. In step S2010, the controller 200 waits for a predetermined amount of time and goes to step S2012. In step S2012, the controller 200 determines whether the subscriber has entered a response to the displayed menu. If the response is received, the controller 200 goes to step S2014; otherwise, the controller 200 goes to step S2020. In step S2014, the controller 200 determines whether the subscriber has selected an option that requires the retrieval of a new menu from the onboard database. The pager may support optional menu selection features permitting the subscriber to select any menu in the onboard database other than the displayed menu. Also if multiple menu identifications were received in step S2000, the subscriber may desire to view the next menu.

If a new menu is requested, the controller 200 goes to step S2016. Otherwise, the controller goes to step S2018. In step S2016, the controller 200 retrieves the requested menu from the onboard database and returns to step S2008 to display the requested menu. In step S2018, the controller 200 returns the subscriber's selection in a response to the page and goes to step S2024 and ends the process.

In step S2020, the controller 200 increments a count and goes to step S2022. In step S2022, the controller 200 determines whether the count exceeded a maximum. If the count exceeded the maximum, the controller 200 goes to step S2024 and ends the process; otherwise, the controller 200 returns to S2010.

The database 110 coupled to the paging service 104 is updated by the subscriber. Functions such as changing the various menu options, adding or deleting menus and adding new callers that may be calling the subscriber through the paging service 104 may be performed. The database 110 may be updated by the subscriber through a terminal 112 connected to the network 100, as shown in FIG. 1.

Figure 10:
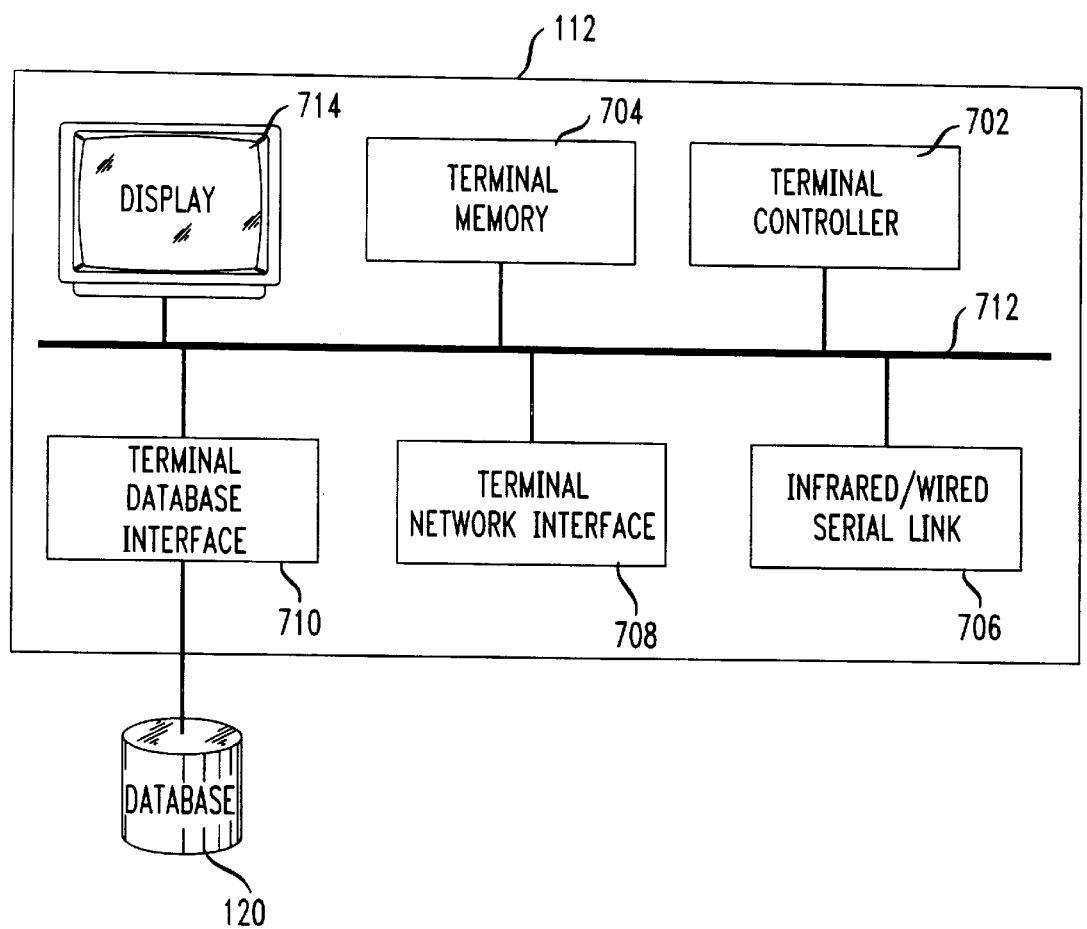
FIG. 10 is a block diagram of the terminal shown in FIG. 1.

FIG. 10 shows a block diagram of an exemplary embodiment of the terminal 112. The terminal 112 includes a terminal controller 702, a terminal memory 704, a terminal display 714, an infrared/wired serial link 706, a terminal network interface 708 and a terminal database interface 710. The terminal database interface 710 interfaces with database 120. The database 120 may be an external database as shown in FIG. 10 or may be a database that is stored in the terminal memory 704.

To update the database 110, the subscriber logs onto the paging service 104 through the terminal network interface 708 and the network 100. Using the display 714, the subscriber may update the database 110 through conventional means such as a graphical editor. After the database 110 is updated, a shadow copy of the database 110 may be stored in the database 120. The onboard database in the pager 108 may be updated by linking the pager 108 to the terminal 112 and downloading the contents of database 120 into the pager memory 202.

The pager 108 and the terminal 112 may be coupled through either an infrared or a wired serial link. The infrared link 214 and/or the wired serial link 212 of the pager 108 may be connected directly to the terminal infrared/wired serial link 706 to download the contents of the database 120 to the memory 202 through the IO interface 206 to the pager 108.

The pager 108 also includes a modem link 210 that permits the pager 108 to be connected directly to the paging service 104 through the network 100. The pager memory 202 may contain a program or script that controls the modem link 210 to download the contents of the database 110 directly to the memory 202 to update the onboard database of the pager 108.

In addition to the above techniques for updating the onboard database in the pager 108, the paging service 104 may also initiate a pager database update automatically during off-peak hours when the bandwidth of the paging service 104 is not heavily used.

Figure 11:
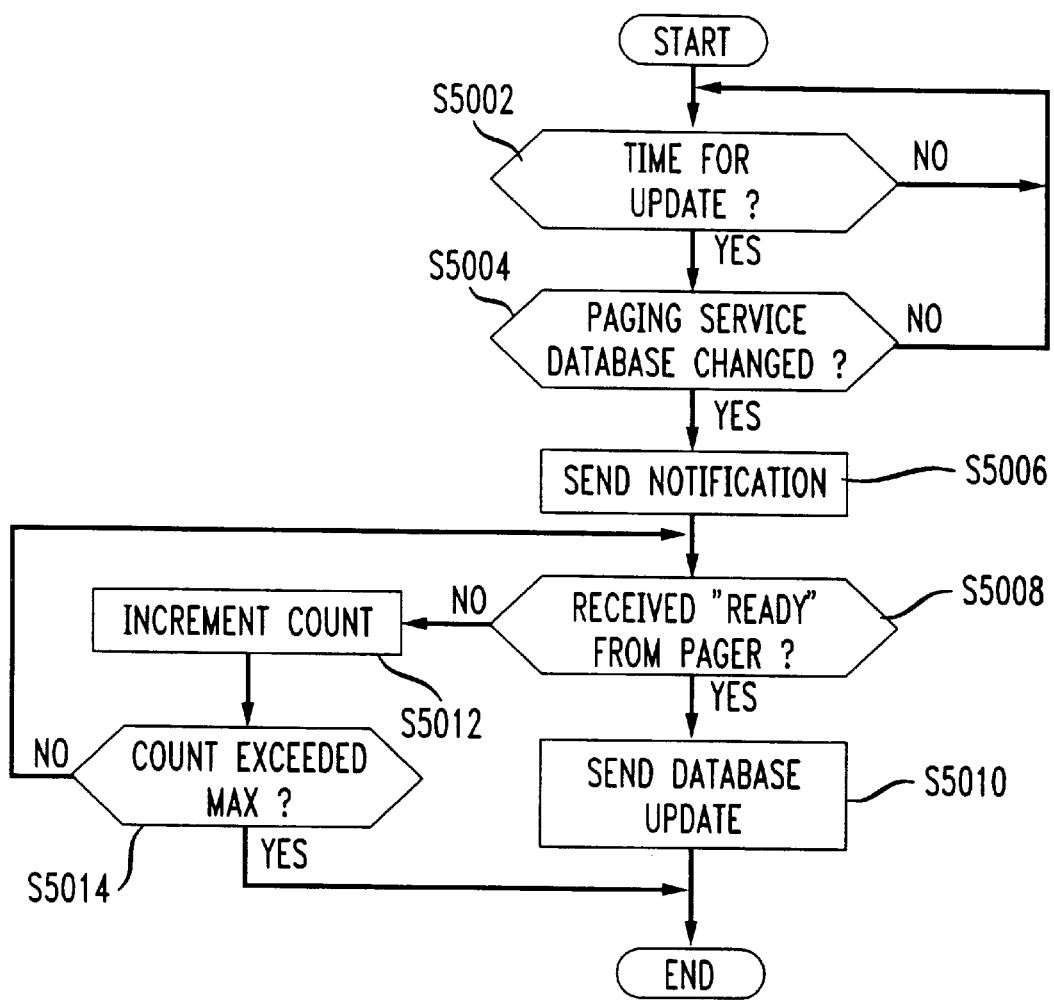
FIG. 11 is a flowchart of a process in the paging service for updating a pager database.

FIG. 11 shows a process of the paging service 104 for updating the database in the pager 108. In step S5002, the paging service controller 602 checks if it is time for updating the database in the pager 108. The time for updating the database in the pager 108 may be preassigned to a predetermined time of day when the bandwidth of the paging service 104 is least utilized such as during the early morning hours. If it is time to update the onboard database of the pager 108, the paging service controller 602 goes to step S5004; otherwise, the paging service controller 602 returns to step S5002.

In step S5004, the paging service controller 602 determines whether the database 110 has been changed. If the database 110 has been changed, the paging service controller 602 goes to step S5006; otherwise, the paging service controller 602 returns to step S5002. In step S5006, the paging service controller 602 sends a notification to the pager 108 that update information may be downloaded to the onboard database in the pager 108 and then goes to step S5008. In step S5008, the paging service controller 602 determines whether a return ready signal has been received from the pager 108 to indicate that the pager 108 is ready to receive the update information. If a ready signal is received, the paging service controller 602 goes to step S5010; otherwise, the paging service controller 602 goes to step S5012.

In step S5010, the paging service controller 602 sends onboard database update data to the pager 108. The paging service controller 602 may either send only changed menu portions of the database 110 or a complete copy of the latest menus depending on the amount of information that has been changed. Then, the paging service controller 602 goes to step S5016 and ends the process.

In step S5012, the paging service controller 602 increments a count and goes to step S5014. In step S5014, the paging service controller 602 determines whether the count has exceeded a maximum. If the count has exceeded a maximum, the paging service controller 602 goes to step S5016 and ends the process; otherwise, the paging service controller 602 returns to step S5008.

Figure 12:
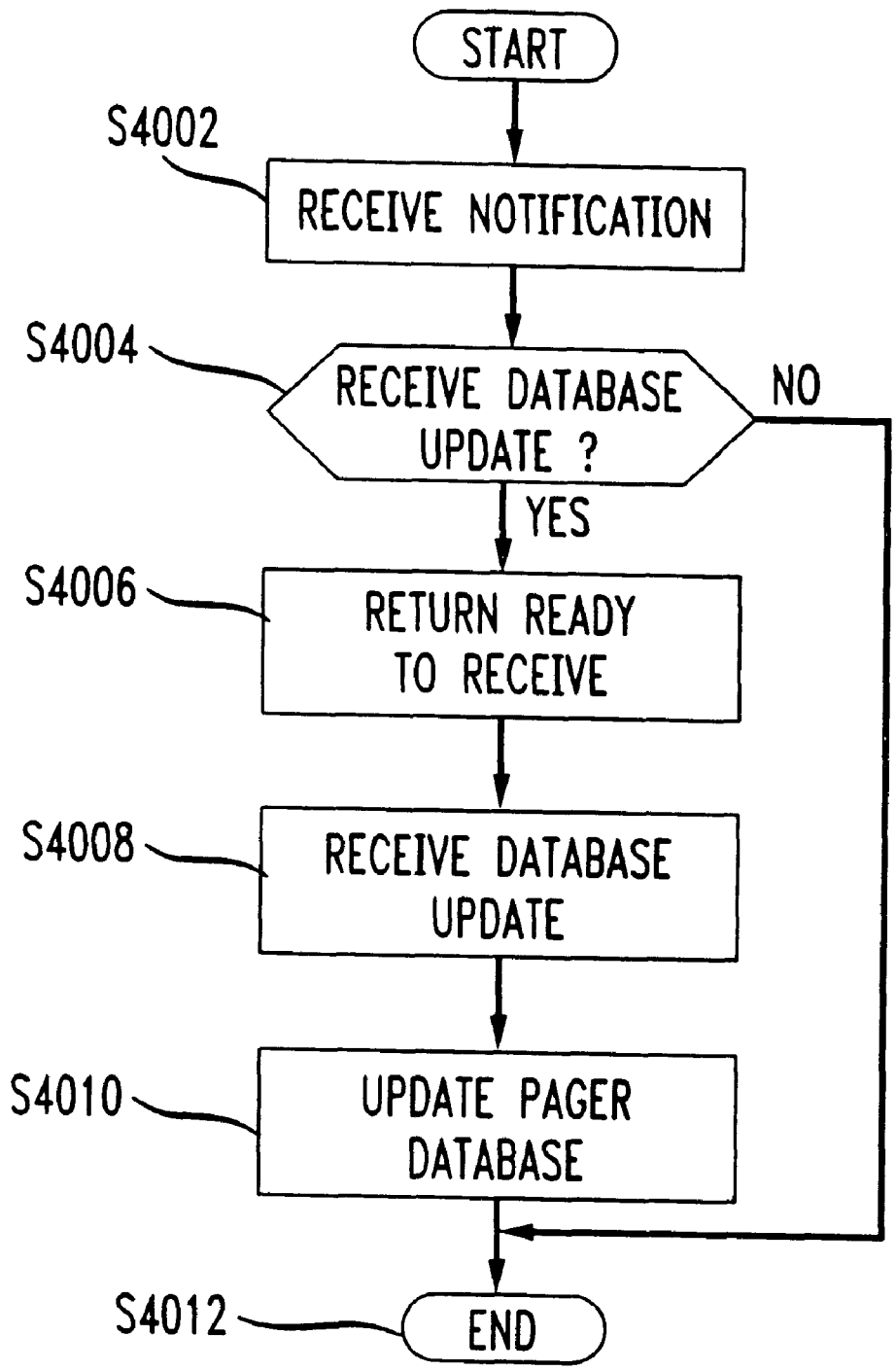
FIG. 12 is a flowchart of a process in the pager for updating the pager database.

FIG. 12 shows a process of the pager 108 for responding to the notification sent by the paging service 104. In step S4002, the controller 200 receives the notification from the paging service 104 and goes to step S4004. In step S4004, the controller 200 determines whether to receive the database update information from the paging service 104 or to ignore the notification. If the onboard database in the memory 202 has already been updated, then the controller 200 goes to step S4012 and ends the process. The onboard database may have been updated via other methods such as by connecting to the database 110 through the modem link 210 or by connecting to the terminal 112 through the infrared or wired serial links 214 and 212, respectively, as discussed earlier. The controller 200 may determine that the onboard database in the memory 202 is current by comparing a time stamp of the onboard database in the memory 202 and a time stamp of the database 110 transmitted with the notification.

In step S4006, the controller 200 returns a ready to receive signal to the paging service 104 and goes to step S4008. In step S4008, the controller 200 receives the database update information and goes to step S4010. In step S4010, the controller 200 updates the onboard database in the memory 202, goes to step S4012 and ends the process.

The pager 108 may send new menus to the paging service 104. The subscriber generates a new menu using either buttons provided on the pager 108 or if the display 118 is a touch screen display, use selection areas such as the selection area 128-132, for example. After the new menu is generated, the subscriber may store the new menu in the onboard database and send the new menu to the paging service 104 by issuing a command from the pager 108.

The new menu may either be a permanent update or a temporary update that is to be erased. The temporary update may be erased after a specified time limit or when the subscriber issues an erase command. For example, if the subscriber is traveling and wants calls to be routed to a different secretary instead of the subscriber's usual secretary, a new menu may be generated that forwards telephone calls to the new secretary rather than the usual secretary. The new menu may be erased after a time limit set by the subscriber such as two weeks and/or erased by the erase command.

Figure 13:
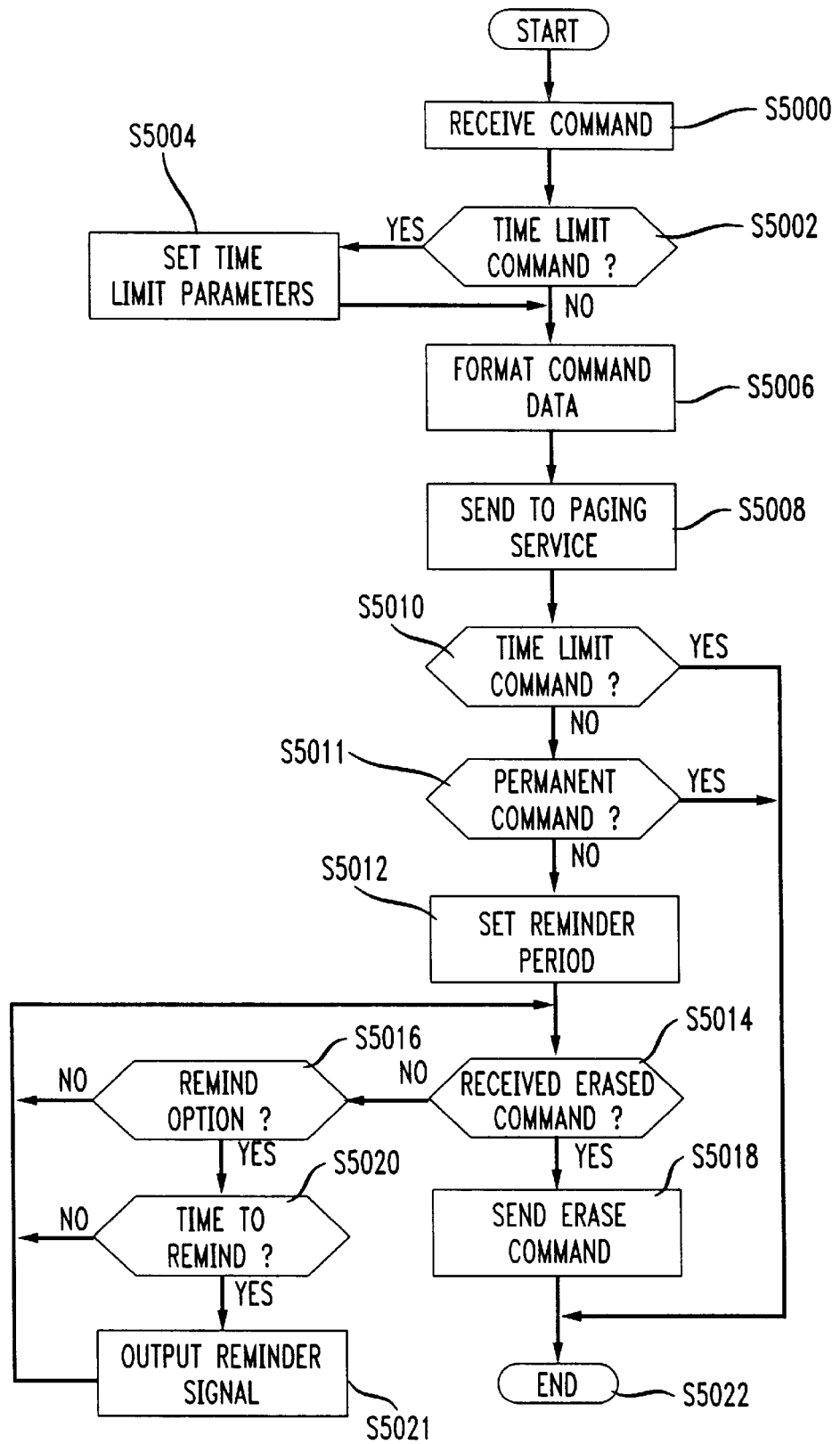
FIG. 13 is a flow chart of the pager process for sending a command to the paging service.

The newly generated menu is sent to the paging service 104 when the pager 108 receives a command from the subscriber. FIG. 13 shows a process of the controller 200 in the pager 108 for responding to the subscriber's command and sending the new menu to the paging service 104.

In step S5000, the controller 200 receives the command from the subscriber and goes to step S5002. In step S5002, the controller 200 examines the command entered by the subscriber and determines whether the command is a time limit command. If the command is a time limit command, the controller 200 goes to step S5004; otherwise, the controller 200 goes to step S5006. In step S5004, the controller 200 sets time limit parameters based on the received command and then goes to step S5006.

In step S5006, the controller 200 formats data corresponding to the command in an encoded form so that transmission time between the pager 108 and the paging service 104 is reduced. Then the controller 200 goes to step S5008. In step S5008, the controller 200 sends the formatted data to the paging service 104 and goes to step S5010. In step S5010, the controller 200 checks if the command received from the subscriber is a time limit command. If the command is a time limit command, the controller 200 goes to step S5022 and ends the process. If the command is not a time limit command, the controller 200 goes to step S5011.

In step S5011, the controller 200 checks if the command is a permanent update command. If the command is a permanent update command, the controller 200 goes to step S5022; otherwise, the controller 200 goes to step S5012. In step S5012, the controller 200 sets a reminder period to remind the subscriber that the new menu sent to the paging service 104 has not yet been erased. Then the controller 200 goes to step S5014.

In step S5014, the controller 200 checks if an erase command is received from the subscriber. If the erase command is received from the subscriber, the controller 200 goes to step S5018; otherwise the controller 200 goes to step S5016. In step S5018, the controller 200 sends the erase command to the paging service 104 to erase data in the database 110 identified by the erase command. The data in the database 110 may be identified by specific names. In this way, the pager 108 may specify a name the data to be erased. Then the controller 200 goes to step S5022 and ends the process.

In step S5016, the controller 200 checks if the subscriber has selected a reminder option. The reminder option reminds the subscriber that a temporary menu update is currently in effect so that the subscriber is reminded to erase the temporary menu. The subscriber may specify the reminder period such as two days or 48 hours in the update command. If the subscriber has selected the reminder option, the controller 200 goes to step S5020; otherwise, the controller 200 returns to step S5014. In step S5020, the controller 200 checks if the reminder period has expired. If the reminder period has expired, the controller 200 goes to step S5021; otherwise the controller 200 returns to step S5014. In step S5021, the controller 200 outputs a reminder signal and then returns to step S5014.

Figure 14:
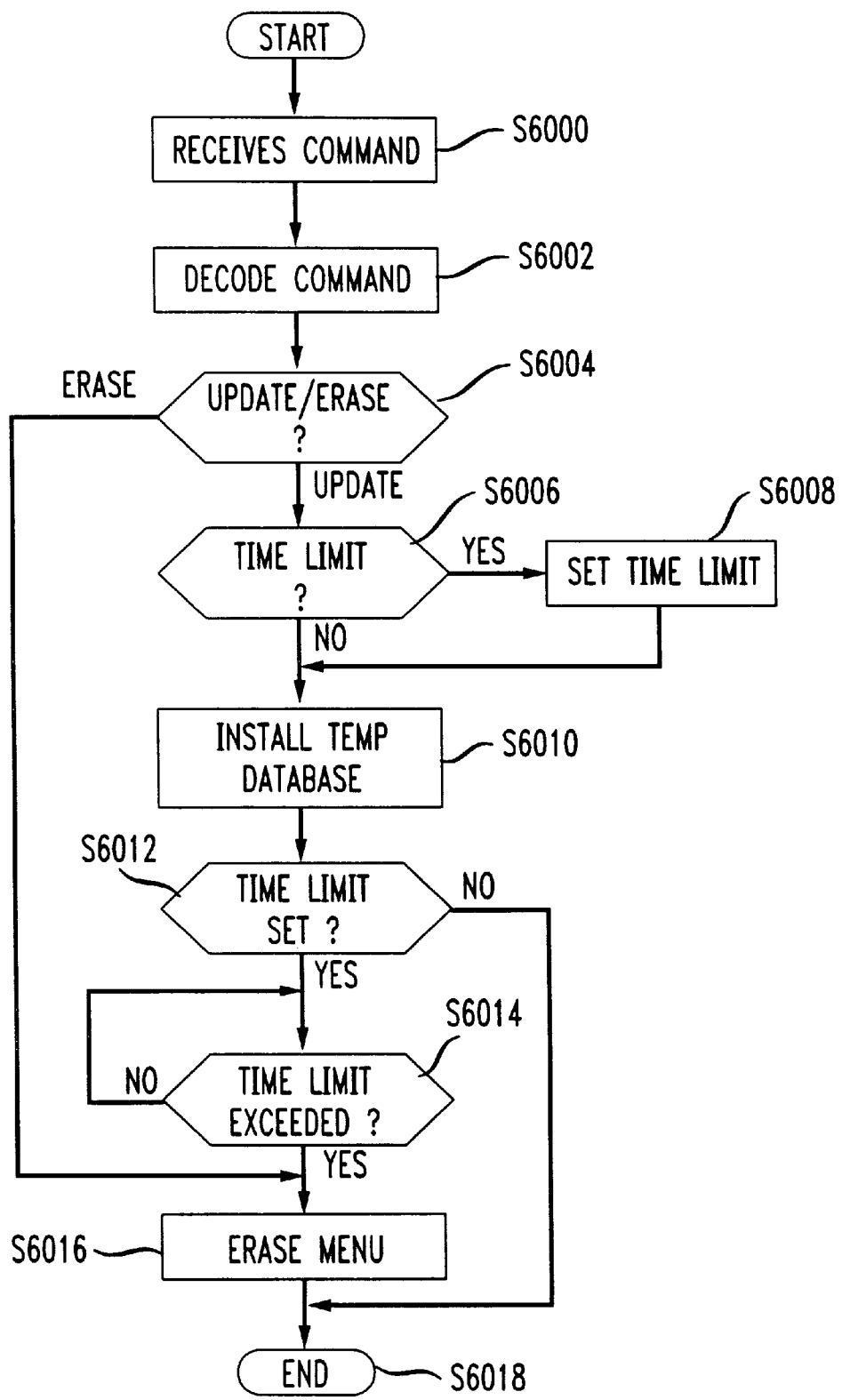
FIG. 14 is a flow chart of the paging service process for receiving a command from the pager.

When the paging service 104 receives either the command to update the database 110 or the erase command, the paging service controller 602 executes a process as shown in FIG. 14. In step S6000, the paging service controller 602 receives the command sent by the pager 108 and then goes to step S6002. In step S6002, the paging service controller 602 decodes the command received from the pager 108 because the pager 108 encoded the command to conserve bandwidth. Then the paging service controller 602 goes to step S6004. In step S6004, the paging service controller 602 determines whether the received command is an update command to update the database 110 with a new menu or an erase command to erase data in the database 110. If the received command is an erase command, the paging service controller 602 goes to step S6016. If the received command is an update command, the paging service controller 602 goes to step S6006.

In step S6006, the paging service controller 602 checks the receive command to determine whether the command is a time limit command. If the command is a time limit command, the paging service controller 602 goes to step S6008; otherwise, the paging service controller 602 goes to step S6010. In step S6008 the paging service controller 602 sets the time limit for the time limit command and then goes to step S6010.

In step S6010, the paging service controller 602 installs the received new menu in the database 110. The installation may involved links to the currently existing database so that when the expected caller corresponding to the new menu calls, the proper menu may be located and the corresponding page may be sent to the pager 108. Then the paging service controller 602 goes to step S6012. In step S6012, the paging service controller 602 checks if the time limit has been set.

If the time limit has been set, then the paging service controller 602 goes to step S6014; otherwise, the paging service controller 602 goes to step S6018 and ends the process.

In step S6014, the paging service controller 602 determines whether the time limit has been exceeded. If the time limit has been exceeded, the paging service controller 602 goes to step S6016; otherwise, the paging service controller 602 returns to step S6014. In step S6016, the paging service controller 602 erases either the menu that was updated by the time limit command or erases data specified in the received erase command. Then the paging service controller 602 goes to step S6018 and ends the process.

While this invention has been described in conjunction with specific embodiments thereof, it is evident that many alternatives, modifications and variations would be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A paging system, comprising:

a paging service; and a pager that includes a first database, wherein the paging service sends a page containing an identification of a menu to the pager, the identification being different than the menu and the menu being prestored in the pager, the pager retrieving the menu from the first database based on the identification and displays the menu, wherein the pager responds to the page based on a selection from the displayed menu.

2. The paging system of claim 1, further comprising a second database coupled to the paging service, wherein when the paging service receives a call directed to the pager, the paging system determines the identification based on a caller identification corresponding to the call and information in the second database.

3. The paging system of claim 2, wherein the information in the second database includes:

a first portion that associates the caller identifications with menu identifications; and a second portion that contains menus, each of the menu identifications corresponding to one of the menus.

4. The paging system of claim 3, wherein menus in the first database correspond to the menus in the second portion of the second database, the menu identifications identifying the same menus in the first database and the second portion of the second database.

5. The paging system of claim 1, wherein the pager displays other menus based on inputs received through a user interface.

6. The paging system of claim 5, wherein the pager responds to the page based on a selection from the displayed menu.

7. A method for operating a paging system, comprising:

sending a page from a paging service to a pager, the page containing an identification of a menu, the identification being different than the menu and the menu being prestored in the pager;

retrieving the menu from a first database of a pager based on the identification;

displaying the retrieved menu;

selecting an item from the displayed menu; and responding to the page based on the selection of the selecting step.

8. The method of claim 7, further comprising:

receiving a call directed to the pager; and determining the identification based on a caller identification that corresponds to the call and information in a second database coupled to the paging service.

9. The method of claim 8, wherein the information in the second database includes:

a first portion that associates the caller identifications with menu identifications; and a second portion that contains menus, each of the menu identifications corresponding to one of the menus.

10. The method of claim 9, wherein menus in the first database correspond to the menus in the second portion of the second database, the menu identifications identifying the same menus in the first database and the second portion of the second database.

11. The method of claim 7, further comprising displaying other menus based on inputs received through a user interface.

12. The paging system of claim 11, further comprising:

selecting an item from the displayed menu; and responding to the page based on the selection of the selecting step.

* * * * *